Feb. 17, 1959 W. F. PETERSON ET AL 2,874,009

TRUNK PISTON

Filed July 11, 1955 2 Sheets-Sheet 1

INVENTORS:
WILLIAM F. PETERSON
WILLIAM M. YENNER

By Bruninga & Sutherland

ATTORNEYS,

INVENTORS:
WILLIAM F. PETERSON
WILLIAM M. YENNER
By Brunige & Sutherland
ATTORNEYS

2,874,009

TRUNK PISTON

William F. Peterson, Creve Coeur, and William M. Venner, Brentwood, Mo., assignors to Sterling Aluminum Products, Inc., St. Louis, Mo., a corporation of Missouri Application July 11, 1955, Serial No. 521,096

8 Claims. (Cl. 309—11)

This invention relates to trunk pistons, particularly of a type designed for use in internal combustion engines for automobiles. Such pistons are usually constructed of a metal of relatively high thermal expansion, such as aluminum and magnesium alloys containing various alloying elements such as copper, silicon, nickel, manganese, etc. Where silicon is employed on the order of 12%, the thermal expansion is materially reduced. Copper, nickel and manganese impart hardness and strength to the alloy. The temperatures encountered in internal combustion engines are, however, high, so that there is liability of seizure when hot and a looseness when cold.

A trunk piston of the type described as heretofore constructed, comprises a head, a skirt, and wrist pin bosses on the inside of the skirt. The head is grooved to receive the piston rings and is of smaller diameter than the skirt, which provides the guiding cross-head for the piston. The skirt is separated by a circumferential slot or slots from the head in one or both regions of the thrust faces so that the piston when heated in the engine, will by hoop-stretch action push out along the boss axis and pull in along the thrust face axis. The skirt may be of circular contour, but is usually made oval with the major diameter in the regions of the thrust faces and with the minor diameter in the regions of the bosses. Some pistons have vertical slots. Furthermore, the piston is also relieved in the regions of the bosses. The skirt is usually given a standard taper with a smaller diameter at the top. By reason of the circumferential slots, the strength of the piston, the conduction of the heat from the head to the skirt and hence from the piston walls, is reduced and oil leakage from between the cylinder and the skirt to the head is increased.

One of the objects of this invention is to provide a piston of the type described whereby the expansion of the piston may still be controlled by a hoop-stretch action so as to maintain a close fit in the cylinder, whether the piston be hot or cold, but in which the strength of the piston is increased, the conduction of the heat from the head to the skirt and hence to the cylinder is increased and oil leakage is practically eliminated.

Further objects will appear from the detailed description in which will be set out illustrative embodiments of this invention; it is to be understood however, that this invention is susceptible of various embodiments within the scope of the appended claims.

Generally stated, in accordance with the illustrative embodiment, the piston is of a metal of relatively high thermal expansion, such as one of the aluminum and magnesium alloys, and it has a head as usual provided with packing ring grooves and a skirt provided with wrist pin bosses and with thrust faces. An element positioned at the top of the skirt extends circumferentially along and through the piston in a thrust face region but unanchored therealong and is cast anchored at its ends in the boss regions of the piston, whereby upon heating of the piston in the cylinder, the skirt will push out on the wrist pin axis and will pull in on the thrust face axis with respect to the head. The element may be below the lowest ring groove so as to be in the skirt below the lowest ring groove, but it also may be located axially at the lower to-be-formed ring groove in which case the skirt extends to that groove; in both cases, however, the element separates the skirt from the head.

The element may be of any suitable metal such as steel, either cold rolled steel or one of the steels which has a very low co-efficient of thermal expansion and which has been employed in pistons. The element may, however, be of a copper alloy or of a bronze alloy having a melting point materially higher than the melting point of aluminum or magnesium.

The separation of the head from the skirt as heretofore constructed has been usually by a circumferential slot, although that restricts the heat flow from the head to the skirt and to the cylinder walls and permits passage of oil and gas. Sometimes the circumferential slot is in the skirt proper and sometimes in the lowest ring groove. In accordance with this invention, those objections are overcome while still permitting radial expansion and contraction of the skirt.

Figure 1:
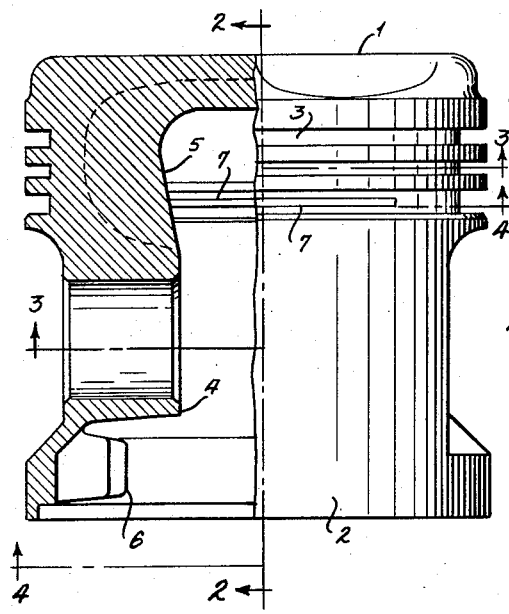
Figure 1 is a side view partially in vertical section and partially in elevation of a piston embodying this invention.
Figure 2:
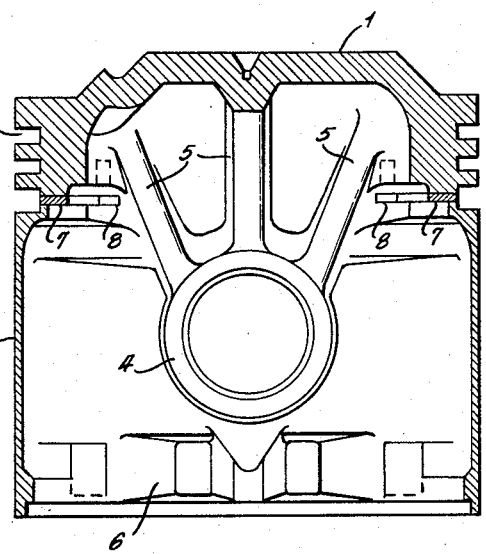
Figure 2 is a section on the line 2—2, Figure 1.
Figure 3:
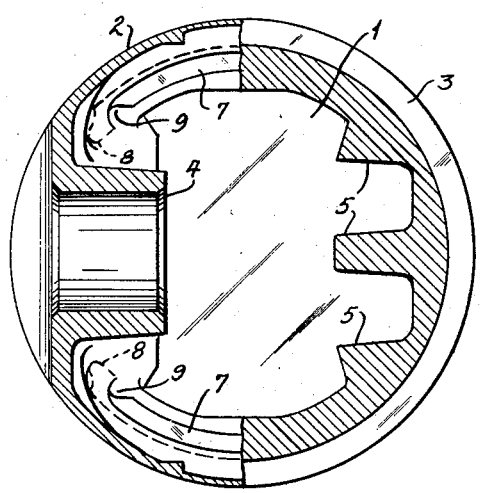
Figure 3 is a section on the line 3—3, Figure 1.
Figure 4:
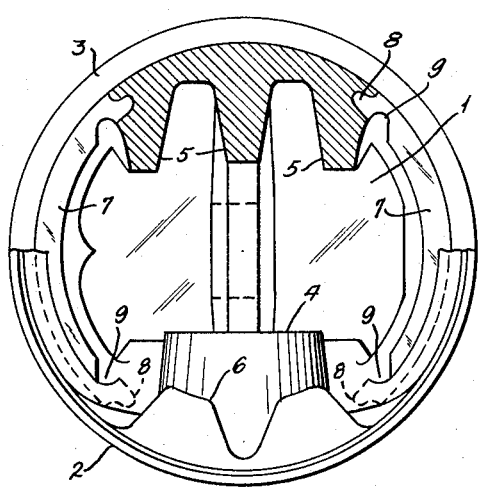
Figure 4 is a part section on the line 4—4, Figure 1, but partly in elevation.
Figure 6:
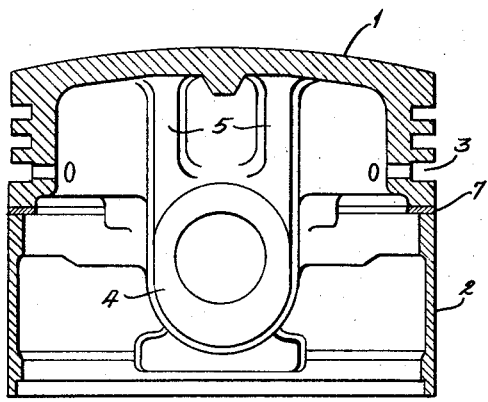
Figure 6 is a view similar to Figure 2 on the line 6—6, Figure 5.
Figure 7:
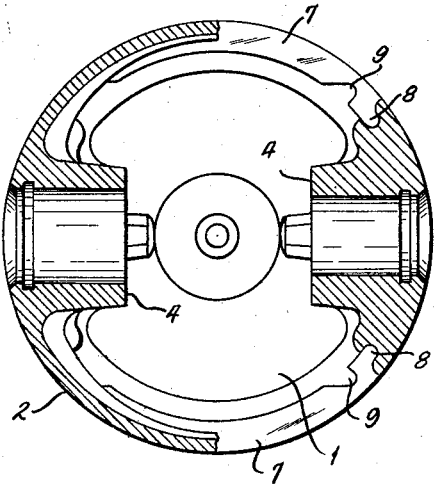
Figure 7 is a section on the line 7—7, Figure 5.
Figure 5:
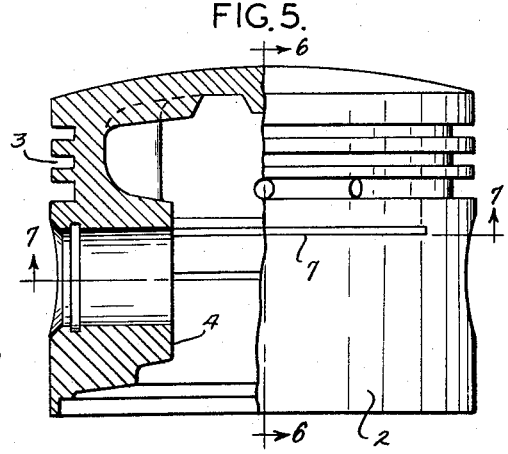
Figure 5 is a view similar to Figure 1, but showing another embodiment of this invention.

In accordance with an illustrative embodiment of this invention as shown in Figures 1–4, in which the slot is opposite the lowest ring groove, this slot is closed by a plate-like element specifically a quarter segmental element 7 which extends circumferentially only along and through the piston in a thrust face region and which is cast anchored in the piston metal by lugs 8 which are seated in recesses in the boss regions. The element may be provided with notches 9 to position the same on the core. In the embodiment shown in Figures 5, 6, 7 in which parts have been designated by the same reference numerals as in Figures 1–4, the element 7 is located in the skirt below the lowest ring groove but likewise closes the slot.

Figure 8:
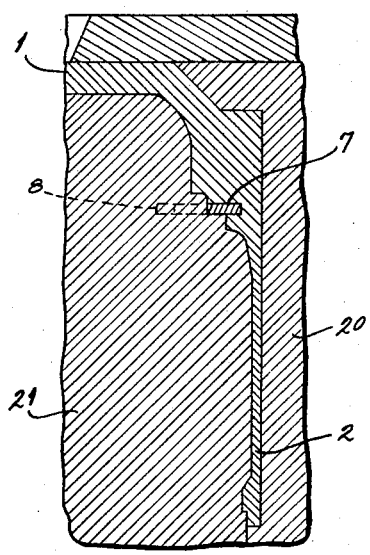
Figure 8 is a detail showing the method of producing the piston of Figures 1 to 4, which method may also be employed in producing the piston of Figures 5–7.

In the method of making the piston, the piston metal is as usually cast in a mold 20 provided with a core 21, as shown in Figure 8 in accordance with the usual permanent mold practice in which the mold and the core are both of steel or iron. Such a permanent mold and core is shown in U. S. Patents Nos. 1,952,199 and 2,676,372. The element 7 is simply placed on the core, the mold is closed and the piston metal is then cast in the mold and over the core as well as over the element so as to produce a piston of the construction shown in Figures 1–4. The piston shown in Figures 5, 6, 7 may be produced in a like manner. After the solidification of the piston metal, the casting is taken off of the core and out of the mold and after cooling is finished to size. This finishing will leave the element cast-anchored at its ends in the boss regions, but exposed in the thrust region, by machining the outside of the piston, Figures 5–7, and in Figures 1–4 by cutting the lowest ring groove. In both of the embodiments of Figs. 1–4 and 5–7, the elements 7 are positioned at the top of the skirt, extend circumferentially along and through but are unanchored along the thrust faces of the skirt and are anchored at their ends in the boss regions. That is not only the case where the elements are below the lowest ring groove as in Figs. 5–7, but that is also the case where the elements are located axially at the lowest ring groove as in Figs. 1–4; for in the latter case the skirt extends functionally to the elements 7 separating the skirt from the head above the elements.

It will be noted that one or both of the thrust faces are separated from the head circumferentially entirely along a thrust face or faces. The element 7 extends circumferentially entirely along the separation between the head and a separated face and extends through the thrust face; this element being anchored in the boss regions but unanchored along the separated thrust face. The element 7 is specifically a plate-like element, which is free from projections on its underside, so as to be unanchored along the separated thrust face in order to permit movement of the thrust face with respect to the element, although it closes the separation between the head and the separated thrust face.

The operation of the piston is similar to one having a circumferential slot or slots in that it has the so-called hoop stretch action; that is, upon heating in the engine, the piston will likewise push out on the wrist pin axis, but pull in on the thrust face axis. That action is permitted in the embodiments, Figs. 1–7, for while upon solidification and cooling of the piston casting on the element 7, it is clamped axially (vertically, Figures 1, 2, 5, 6); upon heating in service in the engine, the clamping action is relieved sufficiently so as to permit the hoop stretch action. It will be understood that the hoop-stretch action, that is, the push-out on the boss axis and the pull-in on the thrust face axis are small, so that the ends of the segments will remain seated at their ends in the boss regions. That is for the reason that upon solidification and cooling of the composite piston after casting, the segments are stressed circumferentially by shrinking of the aluminum on the segments. That stress is only partially relieved when the piston is in service in the engine so as to permit hoop-stretch action of the piston body, but not to an extent where the ends of the segments will loosen in the aluminum body, but the ends of these segments will remain seated in the piston body so that the outside contours of the segments will remain within the outside contour of the piston body, Figs. 6 and 7, and within the contour of the bottom of the groove, Figs. 1–4. By machining the piston oval with the major axis along the thrust face axis and with a minor axis along the wrist pin axis, the oval will compensate for the hoop stretch action. However, the circumferential slot remains substantially closed so that flow of heat from the head to the skirt and to the cylinder wall is not impeded, while flow of oil and gas past the piston is prevented.

While various designs may be employed, examples of actual commercial embodiments are shown in the drawing which are to scale. Thus, in Figures 1–4, the piston, which is drawn to scale, has an outside diameter of 3.528 inches and a length of 3.679 inches. The element 7 is of cold rolled steel, has a thickness of 0.07 inch, a radial dimension of 0.25 inch and extends through an arc of about one quarter of a circumference. The skirt has a taper of about 0.001 and the skirt itself is oval with a major axis on the wrist pin boss of about .015" larger than on the boss axis. Such a piston will remain conformed to the cylinder with a very low clearance.

In accordance with the construction shown in Figures 1–4, the element or elements 7 extends or extend circumferentially along a thrust face or thrust faces and radially to the bottom of the packing ring groove. This is of advantage in that it extends the skirt axially and thus provides for maximum length of the thrust faces to guide the piston and, at the same time, avoids passage of oil and gas through the circumferential slots which are otherwise provided. This construction is also of advantage because it permits, by a single operation, the cutting of the packing ring groove and the exposure of the element or elements 7 along one or both thrust faces. That can be accomplished by a simple core, requiring no radial overhangs to the bottom of the to-be-formed packing ring groove.

It will, therefore, be seen that the invention accomplishes its objects. A piston is provided which can be closely fitted to the cylinder of an internal combustion engine, and which will substantially maintain its dimensions from hot to cold so that there will be no seizing when hot and no slipping when cold. The heat transmission from the head to the skirt and to the cylinder is left substantially unimpaired while leakage of oil and gas past the piston is substantially prevented. The element may be on one or both sides of the piston, and the skirt may have a vertical slot in one or both thrust faces and extending from the element to or nearly to the bottom of the skirt, as is usual in many pistons. The above-described construction is simple, requiring only one or two simple segments which may be cheaply manufactured and more readily placed in a mold and on the core than where a complete ring is employed. It also retains the natural hoop-stretch action of an all-aluminum piston, which by oval grinding can be made to conform to the cylinder of an engine from hot to cold, while avoiding the open circumferential slot or slots of such a piston.

Having thus described the invention, what is claimed and desired to be secured by Letters Patent is:

1. A trunk piston of a metal of relatively high thermal expansion, comprising, a head, a skirt provided with wrist pin bosses and with thrust faces, and a quarter segmental element positioned at the top of the skirt, extending circumferentially only along and through but unanchored along a thrust face of the skirt and cast anchored at its ends in the boss regions, whereby upon heating of the piston in the cylinder, the skirt will push out on the wrist pin axis and will pull in on the thrust face axis with respect to the head.

2. A trunk piston of a metal of relatively high thermal expansion, comprising, a head having a ring groove, a skirt provided with wrist pin bosses and with thrust faces, and a segmental element extending circumferentially along and into a ring groove in a thrust face region and cast anchored at its ends in the boss regions, whereby upon heating of the piston in the cylinder, the skirt will push out on the wrist pin axis and will pull in on the thrust face axis with respect to the head.

3. A trunk piston of a metal of relatively high thermal expansion, comprising, a head, a skirt provided with wrist pin bosses and with thrust faces, and a pair of quarter-segmental elements, each positioned at the top of the skirt, extending only circumferentially but unanchored along a thrust face of the skirt and cast anchored at its ends in the boss regions, whereby upon heating of the piston in the cylinder, the skirt will push out on the wrist pin axis and will pull in on the thrust face axis with respect to the head.

4. A trunk piston of a metal of relatively high thermal expansion, comprising, a head having a ring groove, a skirt provided with wrist pin bosses and with thrust faces, and a pair of segmental elements, each extending circumferentially along and into a ring groove in a thrust face region and cast anchored at its ends in the boss regions, whereby upon heating of the piston in the cylinder, the skirt will push out on the wrist pin axis and will pull in on the thrust face axis with respect to the head.

5. A trunk piston, comprising, a head having a packing ring groove, a skirt having wrist pin bosses and thrust faces, and an element extending circumferentially along one of said thrust faces but being unanchored therealong, said element extending radially to the bottom of said packing ring groove.

6. A trunk piston, comprising, a head having a packing ring groove, a skirt having wrist pin bosses and thrust faces, and elements, each extending circumferentially along one of said thrust faces but being unanchored therein, each of said elements extending radially to the bottom of said packing ring groove.

7. A trunk piston of a metal of relatively high thermal expansion, comprising, a head, a skirt provided with wrist pin bosses and with thrust faces one of said thrust faces being separated from said head circumferentially entirely along said thrust face, and an element exending circumferentially entirely along the separation between said head and said separated thrust face and extending through said thrust face, said element being anchored in the boss regions but being entirely unanchored along said thrust face, whereby upon heating of the piston in the cylinder, the skirt will push out on the wrist pin axis and will freely pull in on the thrust face axis with respect to the head without restraint by said element.

8. A trunk piston of a metal of relatively high thermal expansion, comprising, a head, a skirt provided with wrist pin bosses and with thrust faces, one of said thrust faces being separated from said head circumferentially entirely along said thrust face, and a flat plate-like element extending circumferentially entirely along the separation between said head and said separated thrust face and extending through said thrust face, said element being anchored in the boss regions but free from projections so as to be unanchored along said thrust face, whereby upon heating of the piston in the cylinder, the skirt will push out on the wrist pin axis and will freely pull in on the thrust face axis with respect to the head without restraint by said element.

References Cited in the file of this patent

UNITED STATES PATENTS

| | | |
|---|---|---|
| 1,819,998 | Jardine | Aug. 18, 1931 |
| 2,715,052 | Jardine | Aug. 9, 1955 |
| 2,795,468 | Venner et al. | June 11, 1957 |

FOREIGN PATENTS

| | | |
|---|---|---|
| 684,866 | Great Britain | Dec. 24, 1952 |